United States Patent
Maguire et al.

(10) Patent No.: US 10,230,083 B2
(45) Date of Patent: Mar. 12, 2019

(54) TRACTION BATTERY RETENTION ASSEMBLY

(71) Applicant: Ford Global Technologies, LLC, Dearborn, MI (US)

(72) Inventors: Patrick Daniel Maguire, Ann Arbor, MI (US); Hyung Min Baek, Fremont, CA (US); Stephen Liptak, Livonia, MI (US); Olivia Lomax, Southfield, MI (US); Rodolfo Palma, Sr., Canton, MI (US); Yi Zhang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/340,935

(22) Filed: Nov. 1, 2016

(65) Prior Publication Data

US 2018/0123098 A1    May 3, 2018

(51) Int. Cl.
*B60K 1/04*   (2006.01)
*H01M 2/10*   (2006.01)

(52) U.S. Cl.
CPC ............. *H01M 2/1083* (2013.01); *B60K 1/04* (2013.01); *B60K 2001/0438* (2013.01); *B60K 2001/0472* (2013.01); *B60Y 2200/92* (2013.01); *B60Y 2306/01* (2013.01); *B60Y 2410/10* (2013.01); *B60Y 2410/113* (2013.01); *H01M 2220/20* (2013.01)

(58) Field of Classification Search
CPC .......... B60R 16/04; Y02E 60/12; H01M 2/10; H01M 2/1083
See application file for complete search history.

(56) References Cited

U.S. PATENT DOCUMENTS

| 4,169,191 | A | * | 9/1979 | Alt | ............... | H01M 2/1083 |
| | | | | | | 180/68.5 |
| 5,484,667 | A | * | 1/1996 | Sahli | ............... | B60R 16/04 |
| | | | | | | 180/68.5 |
| 6,040,080 | A | | 3/2000 | Minami et al. | | |
| 6,230,834 | B1 | * | 5/2001 | Van Hout | ............... | B60R 16/04 |
| | | | | | | 180/68.5 |

(Continued)

FOREIGN PATENT DOCUMENTS

CN    102468454    5/2012
DE    102010043899    5/2012

*Primary Examiner* — James A Shriver, II
*Assistant Examiner* — James J Triggs
(74) *Attorney, Agent, or Firm* — Carlson, Gaskey & Olds, P.C.

(57) ABSTRACT

An exemplary traction battery retention assembly includes an attachment feature formed with a portion of an enclosure that houses a battery array. The attachment feature is sized such that a portion of the attachment feature can be received within an attachment feature of the battery array to hold the battery array within the enclosure. Another exemplary traction battery retention assembly includes a projection from an outer wall of a battery array. An attachment feature is formed with a portion of an enclosure that houses the battery array and includes an overhang surface to a surface of the projection to hold the array relative to the enclosure. Yet another traction battery pack assembly includes an enclosure of a battery pack that is formed together with a rib having sides extending to an end face. The rib extends to a structure housed within the enclosure.

16 Claims, 8 Drawing Sheets

(56) References Cited

U.S. PATENT DOCUMENTS

| | | | |
|---|---|---|---|
| 6,368,158 B1* | 4/2002 | Kan | H01R 43/16 439/344 |
| 6,773,437 B2 | 8/2004 | Ogilvie et al. | |
| 8,110,300 B2* | 2/2012 | Niedzwiecki | H01M 2/0245 429/100 |
| 8,342,278 B2* | 1/2013 | Oohashi | B60R 16/04 180/68.5 |
| 8,920,955 B1* | 12/2014 | Chuang | H01M 2/1077 429/7 |
| 9,246,148 B2 | 1/2016 | Maguire | |
| 9,331,321 B2 | 5/2016 | Berger et al. | |
| 9,590,216 B2* | 3/2017 | Maguire | H01M 2/1083 |
| 2003/0047366 A1* | 3/2003 | Andrew | B60L 3/0046 180/68.5 |
| 2006/0166087 A1* | 7/2006 | Ogata | H01M 2/0242 429/153 |
| 2006/0172187 A1* | 8/2006 | Ambrosio | H01M 2/1077 429/120 |
| 2009/0044997 A1* | 2/2009 | Picavet | B60R 16/04 180/68.5 |
| 2011/0143179 A1 | 6/2011 | Nakamori | |
| 2012/0103714 A1 | 5/2012 | Choi et al. | |
| 2012/0156539 A1 | 6/2012 | Honjo et al. | |
| 2012/0177971 A1* | 7/2012 | Cicero | H01M 2/1077 429/120 |
| 2014/0030563 A1* | 1/2014 | Hoshi | H01M 2/1077 429/72 |
| 2015/0072209 A1* | 3/2015 | Tyler | B60R 16/03 429/121 |
| 2015/0318525 A1 | 11/2015 | Maguire et al. | |
| 2016/0036020 A1* | 2/2016 | Gunna | H01M 10/625 429/99 |
| 2016/0126535 A1 | 5/2016 | Qiao et al. | |

\* cited by examiner

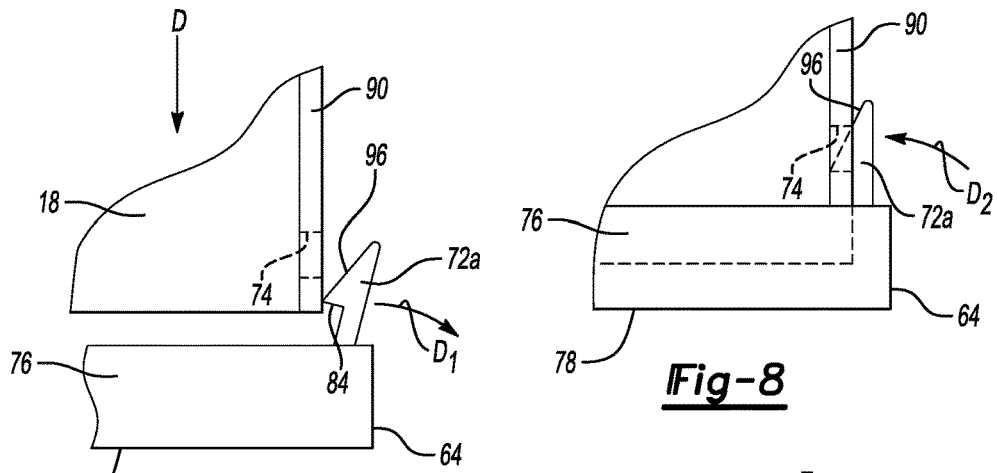
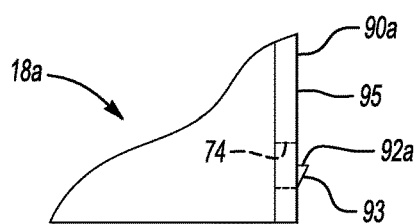
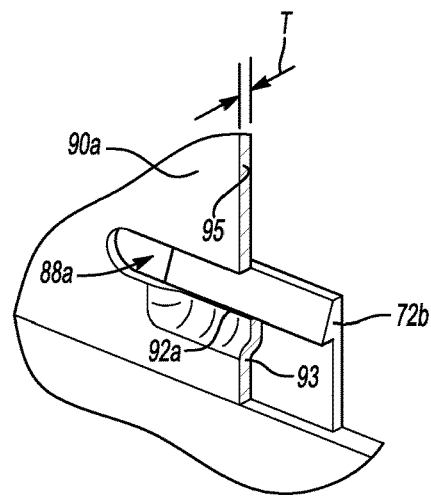
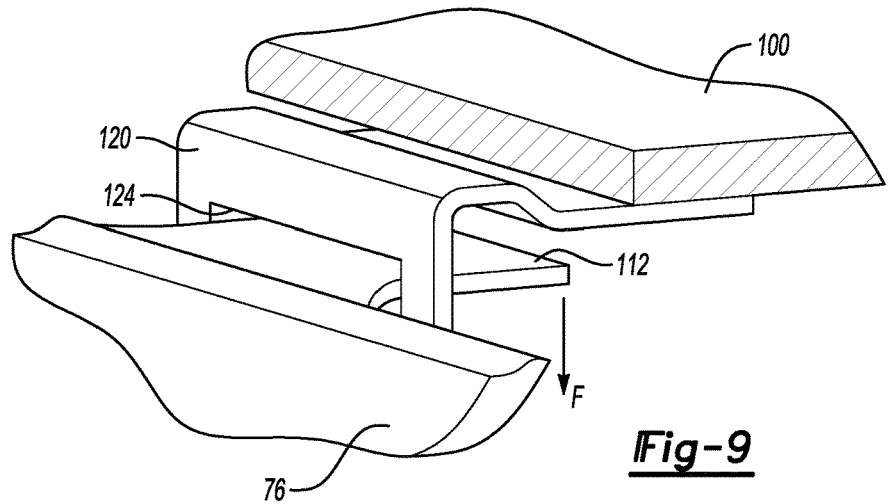

TRACTION BATTERY RETENTION ASSEMBLY

TECHNICAL FIELD

This disclosure relates to mounting a traction battery of an electrified vehicle and, more particularly, to mounting a traction battery having an enclosure formed from a polymer-based material.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery can be used to selectively power the electric machines and other electrical loads of the electrified vehicle. The traction battery includes a plurality of interconnected battery cells that store energy for powering these electrical loads. The battery cells are typically housed within an enclosure. Enclosures are typically a metal or metal alloy. Some enclosures are now polymer-based. At certain pressures, such as the pressures exerted by threaded fasteners, polymers can creep.

SUMMARY

A traction battery retention assembly according to an exemplary aspect of the present disclosure includes, among other things, a first attachment feature formed with a portion of an enclosure that houses a battery array. The first attachment feature sized such that a portion of the first attachment feature can be received within a second attachment feature of the battery array to hold the battery array within the enclosure.

In a further non-limiting embodiment of the foregoing assembly, the first attachment feature extends through an aperture in a thermal exchange plate when engaging the second attachment feature.

In a further non-limiting embodiment of any of the foregoing assemblies, the portion of the enclosure is an enclosure floor.

In a further non-limiting embodiment of any of the foregoing assemblies, the first attachment feature is integrally formed with the portion of the enclosure such that the first attachment feature and the portion of the enclosure are a monolithic structure.

In a further non-limiting embodiment of any of the foregoing assemblies, the first attachment feature is a hook and the second attachment feature provides a surface to interface with an overhang surface of the hook.

In a further non-limiting embodiment of any of the foregoing assemblies, the second attachment feature is an aperture in the battery array.

In a further non-limiting embodiment of any of the foregoing assemblies, the enclosure is formed of a polymer-based material.

In a further non-limiting embodiment of any of the foregoing assemblies, the battery array is disposed along an axis, and an axial length of the first attachment feature is less than an axial length of the second attachment feature.

A further non-limiting embodiment of any of the foregoing assemblies includes a cantilever extending from a first structure, the cantilever received within an aperture of a second structure and biased against the second structure to restrict movement of the enclosure relative to a vehicle frame.

In a further non-limiting embodiment of the foregoing assembly, the first structure is a portion of a battery pack enclosure and the cantilever is formed together with the portion of the enclosure.

In a further non-limiting embodiment of any of the foregoing assemblies, the second structure is a vehicle frame, and the vehicle frame includes edges providing the aperture. The vehicle frame is a metal or metal alloy and the edges are radiused.

In a further non-limiting embodiment of any of the foregoing assemblies, the second structure includes a primary side of the aperture. The cantilever is biased against the primary side in a first direction. The second structure also includes another side of the aperture. The other side of the aperture contacts the cantilever to restrict movement of the cantilever in at least one second direction that is transverse to the first direction.

In a further non-limiting embodiment of any of the foregoing assemblies, the assembly includes a strap secured to the vehicle frame and supporting the battery pack. The strap interfaces with a plurality of ribs along a corner of an enclosure of the battery pack.

A traction battery retention assembly according to yet another exemplary aspect of the present disclosure includes, among other things, a projection from an outer wall of a battery array, an attachment feature formed with a portion of an enclosure that houses the battery array. The attachment feature extends from an enclosure surface and including an overhang surface facing the enclosure surface. The overhang surface contacts a surface of the projection to hold the array relative to the enclosure.

In a further non-limiting embodiment of the foregoing assembly, the projection is a flange folding outward away from the adjacent areas of the outer wall.

A traction battery pack assembly according to yet another exemplary aspect of the present disclosure includes, among other things, an enclosure of a battery pack. The enclosure is formed together with at least one rib having sides extending to an end face. The at least one rib extends to a structure housed within the enclosure, and contacts the structure to restrict movement of the enclosure relative to the structure.

In a further non-limiting embodiment of the foregoing assembly, the at least one rib is received within an aperture of the structure such that contact between the sides and the structure locate the enclosure relative to the structure.

In a further non-limiting embodiment of any of the foregoing assemblies, the end face of the at least one rib extends to contact the structure such that loads transfer from the structure to the enclosure through the end face of the at least one rib.

In a further non-limiting embodiment of any of the foregoing assemblies, the assembly includes a foamed polymer molding disposed within an interior of the enclosure. The at least one rib extends to the structure through an aperture in the foamed polymer molding.

In a further non-limiting embodiment of any of the foregoing assemblies, the assembly includes a foamed polymer molding disposed within an interior of the enclosure. The enclosure includes retention features that engage corresponding retention features to hold a component of the battery pack between the foamed polymer molding and the enclosure.

BRIEF DESCRIPTION OF THE FIGURES

The various features and advantages of the disclosed examples will become apparent to those skilled in the art from the detailed description. The figures that accompany the detailed description can be briefly described as follows:

FIG. 7 illustrates a schematic side view of the first attachment feature when installing one of the battery arrays within the tray.

FIG. 8 illustrates the schematic side view of FIG. 7 after the battery array has been installed and the first attachment feature is in an engaged position.

FIG. 8A illustrates a schematic side view of a second attachment feature according to another exemplary embodiment.

FIG. 8B illustrates a perspective, partially sectioned view of portions of the FIG. 8A embodiment.

FIG. 9 illustrates a close-up, perspective view of a cantilever member of the tray positioned within a structure associated with the vehicle frame of FIG. 1.

DETAILED DESCRIPTION

This disclosure is directed toward mounting a traction battery to an electrified vehicle. An enclosure of the exemplary traction battery is polymer-based and incorporates features to facilitate the mounting. These and other features are discussed in greater detail in the following paragraphs of this detailed description.

Figure 1:
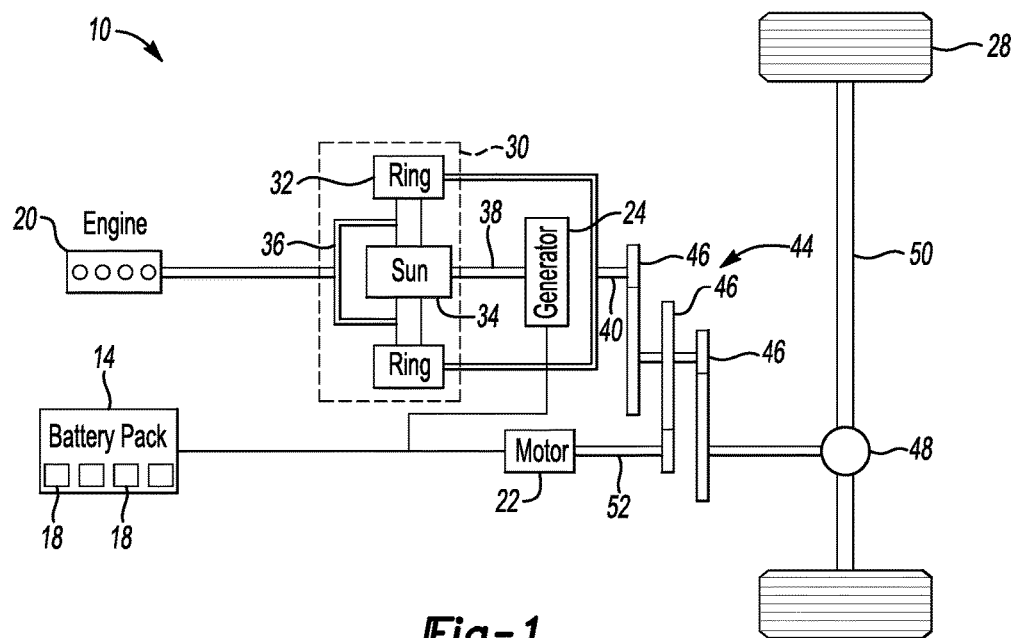
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
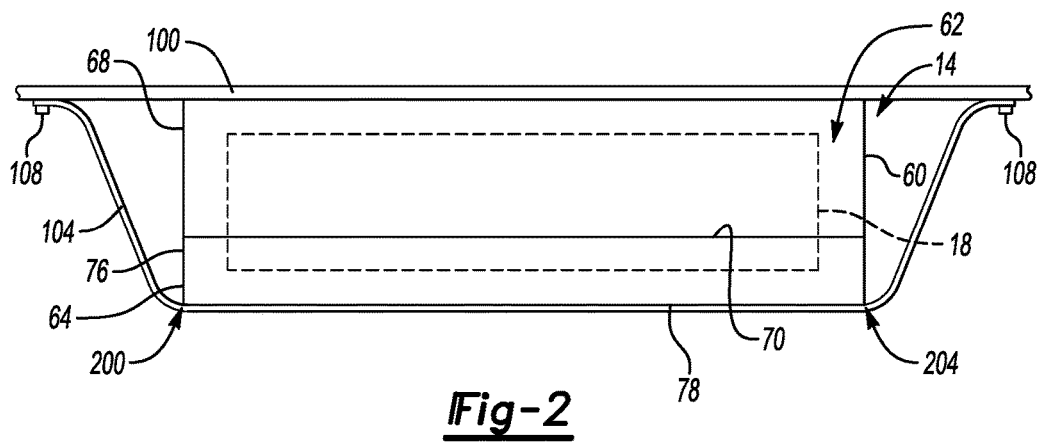
FIG. 2 illustrates a schematic view of the battery pack within the powertrain of FIG. 1 secured to an underbody of an electrified vehicle.

Referring now to FIG. 2 with continued reference to FIG. 1, the battery pack 14 includes an enclosure 60 housing one or more of the battery arrays 18 within an interior 62 of the enclosure 60. The enclosure 60 is a polymer-based enclosure, such as a thermoplastic or thermoset. The exemplary enclosure is a neat, or pure, thermoplastic. Other examples could include other types of thermoplastics and thermosets with structural fibers and or fillers added.

The enclosure 60 generally includes a tray 64 and a cover 68. The tray 64 is hermetically sealed to the cover 68 along an interface 70. Vibration welding, laser welding, infrared welding, adhesives or other joining methods can be used to secure the tray 64 to the cover 68 and to provide the hermetic seal.

Array Attachment Features

Figure 3:
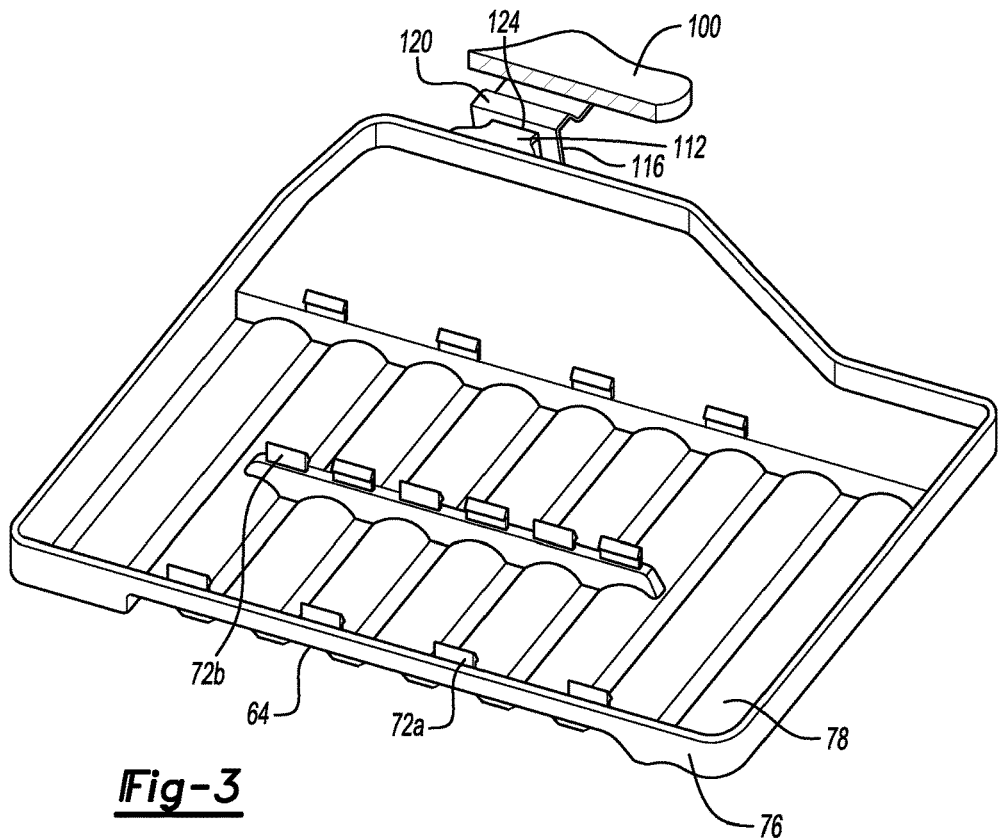
FIG. 3 illustrates a perspective view of a tray from an enclosure of the battery pack of FIG. 2.
Figure 4:
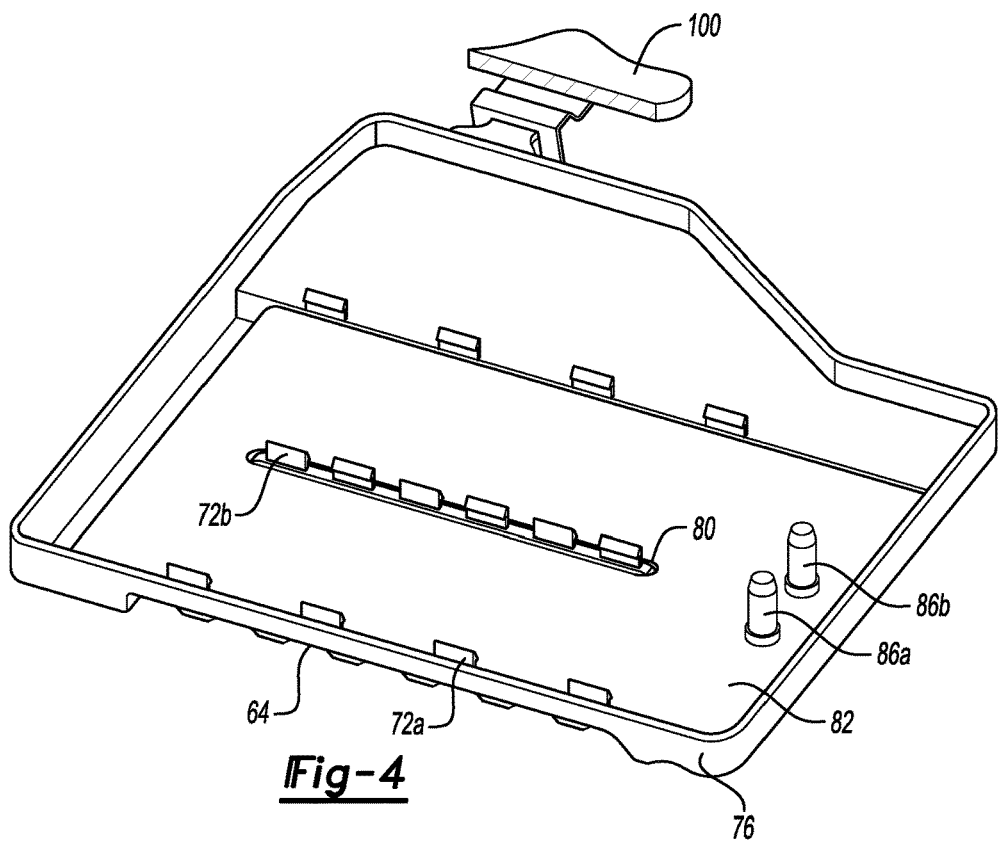
FIG. 4 illustrates a perspective view of the tray of FIG. 3 with a thermal exchange plate.
Figure 5:
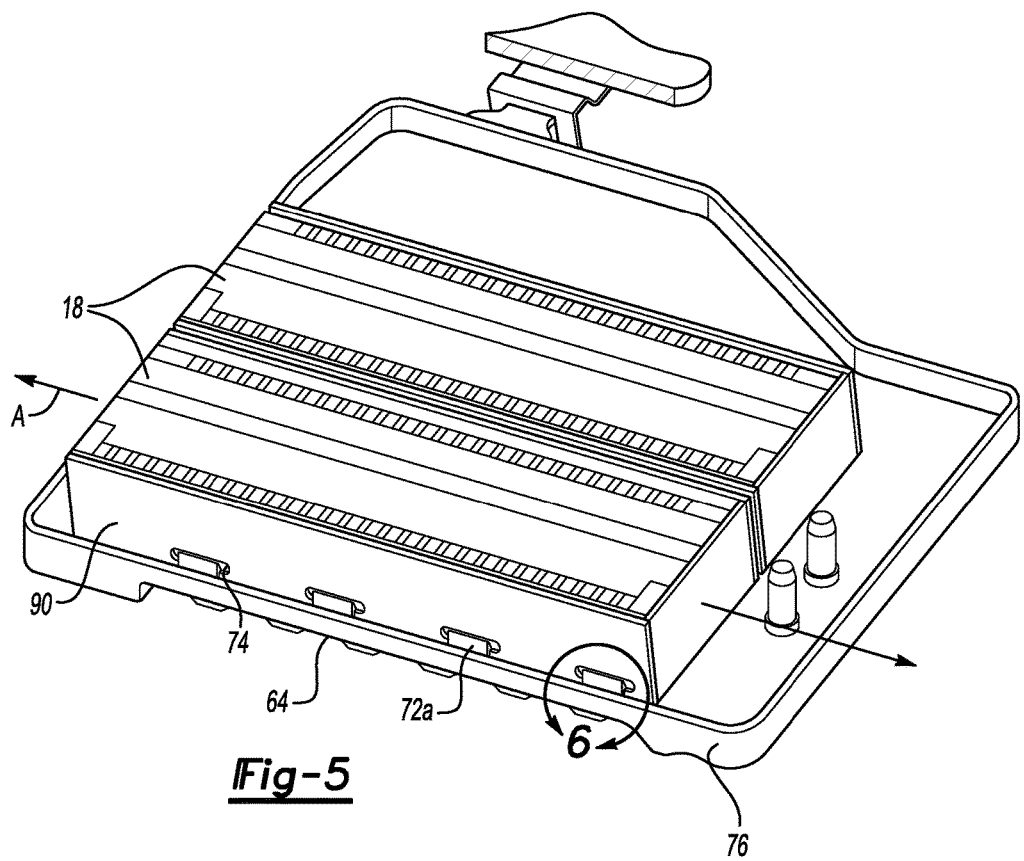
FIG. 5 illustrates a perspective view of the tray of FIG. 3 with a plurality of battery arrays disposed on the thermal exchange plate.

Referring now to FIGS. 3-5 with continuing reference to FIG. 2, the tray 64 includes a plurality of first attachment features 72*a*, 72*b* that engage second attachment features 74 of the battery arrays 18 to secure the battery arrays 18 within the interior 62 of the enclosure 60.

The first attachment features 72*a*, 72*b* are integrally formed [with the other positions of tray 64. The first attachment features 72*a*, 72*b* can be molded together with the other portions of the tray 64, for example. Although illustrated in this exemplary non-limiting embodiment as being formed with the tray 64 of the enclosure 60, the first attachment features 72*a*, 72*b* could be formed with another portion of the enclosure 60 such as the cover 68.

The tray 64 generally includes a plurality of sidewalls 76 extending from a floor 78. When the arrays 18 are in the installed position, the arrays 18 rest on a thermal exchange plate 82 disposed the floor 78. The sidewalls 76 extend transversely from the floor 78 to meet the cover 68 at the interface 70 (FIG. 2).

In this exemplary non-limiting embodiment, the first attachment features 72*a*, 72*b* extend from a surface of the enclosure 60, here the floor 78 of the tray 64. When the cover 68 is secured to the tray 64, the first attachment features 72*a*, 72*b* are contained entirely within the interior 62. That is, the hermetic seal of the interface 70 is outside the first attachment features 72*a*, 72*b* relative to the interior 62.

In this example, some of the first attachment features 72*b* that extend from the floor 78 extend through an aperture 80 of the thermal exchange plate 82.

When the first attachment features 72*a* secure the arrays 18 in the installed position, the thermal exchange plate 82 is positioned between a bottom facing surface of the arrays 18 and the floor 78. A fluid can be circulated through channels in the thermal exchange plate 82 to manage thermal energy levels within the arrays 18 and within other areas of the battery pack 14. An inlet 86*a* and an outlet 86*b* can communicate the fluid to the channels.

Figure 6:
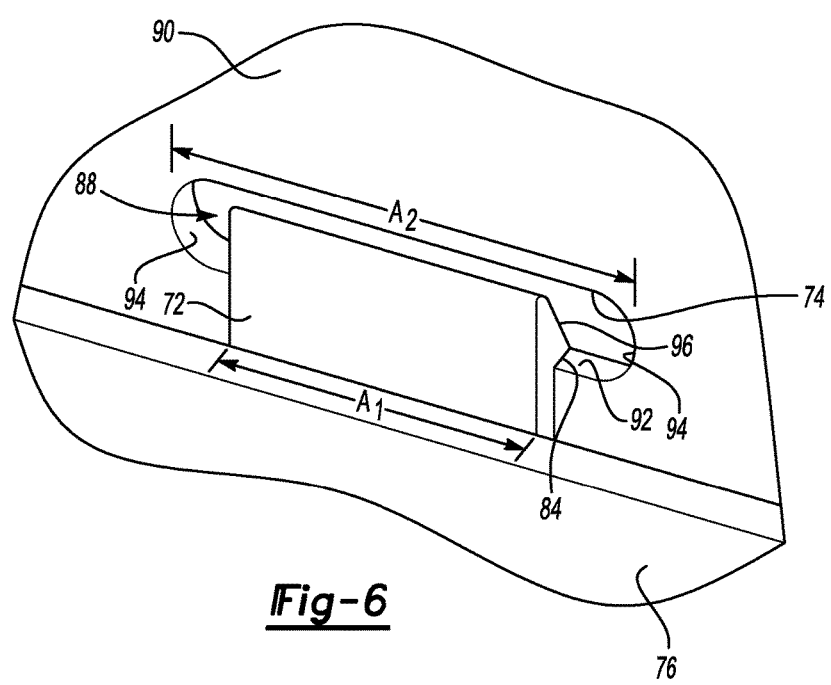
FIG. 6 illustrates a close-up view of a first attachment feature of the tray engaging a second attachment feature of the battery arrays.

Referring now to FIG. 6, the example first attachment features 72*a*, 72*b* can be said to have a half-arrowhead profile. In particular, the example first attachment features 72*a*, 72*b*, extend from the floor 78, which is an enclosure surface, and include a hook having an overhang surface 84 facing the floor 78.

The first attachment features 72*a* are formed just inside the portion of the tray 64 providing the sidewall 76, which permits the first attachment features 72*a* to flex without substantially distorting the sidewall 76. The position of the first attachment features 72*a* inside the sidewall 76 also permits the first attachment features 72*a* from interfering with the interface 70 when the cover 68 is secured to the tray 64.

The example second attachment features 74 are each provided by an aperture 88 or slit within an array sidewall 90. When the arrays 18 are in an installed position (FIG. 6), the first attachment features 72*a*, 72*b* each engage a respective one of the second attachment features 74 such that the hook extends into the aperture 88 and the overhang surface 84 rests against a surface 92 of the second attachment feature 74. The array sidewalls 90 are steel, in this example. The apertures 88 can be stamped into the array sidewalls 90.

As shown in FIG. 7, movement of one of the arrays 18 toward the floor 78 of the tray 64 in a direction D causes the array 18 to slide along a ramped surface 96 of the first attachment feature 72*a*, which leverages the flexibility of the thermoplastic and forces the first attachment feature 72*a* to flex outward away from the array 18 in a direction $D_1$. The bottom edges of the array sidewalls 90 that initially contact the ramped surface 96 can be bent or ramped inward toward the axial center of the arrays 18 to facilitate movement of the array sidewalls 90 along the ramped surface 96. As the array 18 continues to move in the direction D, the overhang surface 84 eventually aligns with the second attachment feature 74.

As shown in FIG. 8, when aligned, the first attachment feature 72*a* snaps back in a direction $D_2$ into the second attachment feature 74 to return the first attachment feature 72*a* to an unflexed position. The overhang surface 84 of the first attachment feature 72*a* then rests against the surface 92 of the second attachment feature 74. Contact between the overhang surface 84 and the surface 92 then resists movement of the arrays 18 away from the floor 78 and holds the thermal exchange plate 82 in position. The first attachment features 72*b* are engaged similarly to the first attachment features 72*a*.

Although the second attachment feature 74 is shown as the aperture 88 providing the surface 92 to interface with the overhang surface 84, other examples could provide the surface 92 in other ways.

For example, referring to FIGS. 8A and 8B, a wall 90*a* of another example array 18*a* could be stamped to include a flange 93 having a surface 92*a*. The flange 93 is bend and folded outward from the adjacent areas of array sidewall 90 creating an aperture 88*a* in the wall 90*a*. The flange 93 with the surface 92*a* could be provided by slicing and flaring out the array sidewall 90*a* rather than by using a punching process.

In this example, a material thickness T of the wall 90*a* is maintained along a vertical height of the wall 90*a*. That is, a material thickness of the wall is not increase locally to provide the surface 92*a*.

In such an example, the flange 93 provides a surface 92*a* to interface with an overhang surface of an attachment feature, such as the first attachment features 72*b*, extending from a surface of an enclosure 60 (FIG. 3). The flange 93 thus provides a second attachment feature for engaging a first attachment feature of the enclosure 60.

The attachment features 72*b* are not necessarily received within the aperture 88*a* of the sidewall 90*a*. Further, the attachment features 72*b* can engage the surface 92*a* without extending into a plane defined by an outer surface 95 of the wall 90*a* that surrounds the flange 93 and the aperture 88*a*. This is due to the surface 92*a* being flared outside the plane. The plane defined by an outer surface 95 of the wall 90*a* extends perpendicular from the page in FIG. 8A.

Although described in connection with the wall 90*a*, the surface 92*a* could be located in another area of the array 18, such as an endwall at an axial end of the array 18.

In other examples, the surface 92*a* to interface with attachment feature extending from the enclosure is provided by a ridge or wrinkle projecting from the a plane defined by the surrounding areas of a wall of an array. The ridge or wrinkle could be provided without any aperture in the wall of the array.

The surface 92*a* could be located near a vertical top or a vertical bottom of the wall 90*a*. The surface 92*a* located near the vertical top could be used to engage a first attachment feature extending from the cover 68 of the enclosure 60, for example (FIG. 2).

Referring again to FIGS. 5 and 6, the arrays 18 each include a plurality of battery cells distributed along a respective axis A. With reference to the axes of the arrays 18, the first attachment features 72*a*, 72*b* each have an axial length $A_1$, and the second attachment features 74 have an axial length $A_2$. Notably, the axial length $A_1$ of the first attachment features 72*a*, 72*b* is less than the axial length $A_2$ of the second attachment features 74. This permits the first attachment features 72*a*, 72*b* to be at least partially received within the aperture 80 when the arrays 18 are in the installed position. That is, the axial length $A_1$ being no greater than the length $A_2$ permits a portion of the first attachment feature 72*a*, 72*b* to be received within the corresponding second attachment feature 74. Contact between the first attachment feature 72 and one of the sides 94 of the aperture 88 can prevent the arrays 18 from moving relative to the floor 78 along the axis A. The sides 94 are have a radius in this example, but could be squared off to provide a more effective interface for blocking the relative movement along the axis A.

The first attachment features 72*a*, 72*b* each have an axial length $A_1$ that is less than the axial length $A_2$ for the corresponding second attachment feature 74. However, the axial length $A_1$ may differ among the different first attachment features 72*a*, 72*b* of the tray 64, and the axial length $A_2$ of the second attachment features 74 may differ among the different second attachment features 74 of the arrays 18.

Reducing the axial length $A_1$ permits more of the first attachment features 72*a*, 72*b* to be included within a given portion of the tray 64 and thus a tighter packaging density. For example, with reference to the first attachment features 72*b* that extend through the aperture 80 of the thermal exchange plate 82 in FIG. 3, three of the attachment features 72*b* engage corresponding second attachment features 74 of one of the arrays 18, and three of the first attachment features 72*b* engage corresponding second attachment features 74 of the other array 18.

If the axial lengths $A_1$ the first attachment features 72*b* extending through the aperture 80 were greater, packaging constraints may necessitate using less than three of the first attachment features 72*b* to engage one of the arrays 18. The reduced axial lengths $A_1$ of the first attachment features thus permits more of the first attachment features 72*b* to be included within a given axial area of the tray 64, which can provide a more secure mounting of the arrays 18 within the interior 62.

Additionally, when compared to other designs, the first attachment features 72*a*, 72*b* have a greater cross-sectional area of material where the first attachment features 72*a*, 72*b* extend from the sidewalls 76 and floor 78 of the tray 64. In this example, a cross-sectional area of the first attachment features 72*a*, 72*b* remains relatively consistent from where the first attachment features 72*a*, 72*b* extend from the floor 78 all the way to the overhang surface 84.

Notably, the cross-sectional area is proportional to the amount of load that the first attachment features 72*a*, 72*b* can carry. Thus, the first attachment features 72*a*, 72*b* are more capable and can be designed to provide a greater retention capability than designs with less cross-sectional area. Since the first attachment features 72*a*, 72*b* have greater retention capability, less of the first attachment features 72*a*, 72*b* are required to retain the arrays 18 relative to the tray 64 (or the cover 68 if the first attachment features 72*a*, 72*b* extend from the cover 68. In this exemplary embodiment, the sides of the arrays 18 are held by a plurality of separate attachment features 72*a*, 72*b*. Specifically, the outwardly facing sides engage four attachment features 72*a*, 72*b*, and the inwardly facing sides engage three attachment features 72*b*. In other exemplary embodiments, the sides could engage other numbers of the attachment features 72*a*, 72*b*. For example, the three attachment features 72*a* could be replaced by a single attachment feature that is longer than the attachment features 72*a*. The single attachment features could extend along the side of the array 18, such that the side of the array only engages one attachment feature.

In some other examples, the walls (or endplates) at the axial ends of the arrays 18 could instead or additionally engage with attachment features like the first attachment features 72*a*, 72*b*. Further, the cover 68 could instead, or additionally, include first attachment features 72*a*, 72*b* to engage with the arrays 18. That is, the first attachment features 72*a*, 72*b* could be formed into any portion of the enclosure 60 and be configured to engage second attachment features 74 in any portion of the arrays 18.

Cantilevered Support

Figure 10:
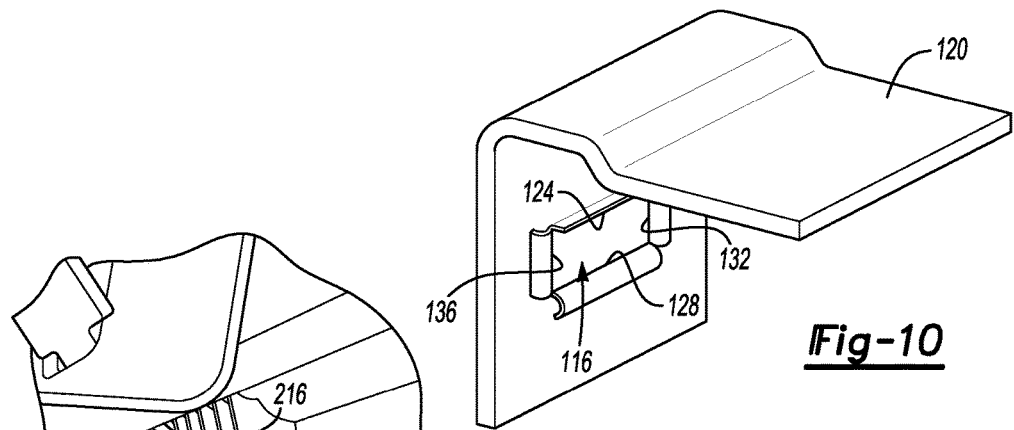
FIG. 10 illustrates a perspective view of the structure of FIG. 9.

Referring now to FIGS. 9 and 10 with reference to FIGS. 2 and 3, the exemplary battery pack 14 can be secured to a vehicle frame 100 utilizing one or more straps 104 made of metallic, polymeric, or other materials. Opposing ends of the straps 104 are secured to the vehicle frame 100 using a mechanical fastener or another method of attachment. The straps can compress the battery pack 14 against the vehicle frame 100.

In this exemplary non-limiting embodiment, the vehicle frame 100 is a portion of an underbody of an electrified vehicle. The straps 104 compress the battery pack 14 upwards against the vehicle frame 100. Although the straps 104 secure the battery pack 14, some areas of the battery pack 14 could vibrate, which can impact the durability of the battery pack 14.

To address potential vibrations, the tray 64 of the exemplary battery pack 14 is formed with a cantilever 112. When the straps 104 pull the battery pack 14 toward the vehicle frame 100, the cantilever 112 is biased, which introduces a force on the battery pack 14 that counteracts, for example, vibrations.

The example cantilever 112 is a flange extending from the sidewall 76 of the tray 64. As the battery pack 14 is installed, the cantilever 112 is positioned within an aperture 116 of a bracket 120 that is secured directly to the vehicle frame 100. In another example, the aperture 116 is provided within the vehicle frame 100 rather than within the bracket 120.

As the straps 104 are tensioned and the battery pack 14 is driven upwards against the vehicle frame 100, the cantilever 112 contacts a downwardly facing side 124 of the bracket 120. The cantilever 112 is biased and flexed in a direction F away from the vehicle frame 100 as the straps 104 pull the remaining portions of the battery pack 14 toward the vehicle frame 100.

The biasing applies a force on the cantilever 112, which can prevent the battery pack 14, especially the areas near the cantilever 112, from vibrating during typical operation of the electrified vehicle. That is, although the battery pack 14 is supported by the straps 104, the cantilever 112 can inhibit the areas of the battery pack 14 that are offset from the straps 104 from vibrating up and down during operation of the electrified vehicle including the battery pack 14.

During severe vibrations, the cantilever 112 could contact a bottom side 128 of the aperture 116 to resist movement of the battery pack 14, especially the areas near the cantilever 112, downward away from the vehicle frame 100.

The cantilever 112 could also contact lateral sides 132 and 136 of the aperture 116 to resist forward-aft movement of the battery pack 14 relative to the vehicle frame 100. The width of the cantilever 112 is undersized relative to the width of the aperture 116, which can permit the battery pack 14 to shift with the straps 104 during an impact event and receive resulting loads over a longer duration of time, which reduces the peak energy magnitude into the battery pack 14.

The cantilever 112 can be molded with a series of ribs to increase bending stiffness of the cantilever 112. The ribs could extend from an underside of the cantilever 112 facing away from the side 124, for example.

The exemplary bracket 120 providing the aperture 116 is formed from a metal or metal alloy. The aperture 116 could be stamped within the bracket 120. In some examples, some edges of the bracket 120 that provide the aperture 116 are radiused as shown in FIG. 10 to soften the sides of the bracket 120 potentially interfacing with the cantilever 112. Softening these sides can inhibit the bracket 120 from damaging the cantilever 112, which is formed with the tray 64 and made of a polymer-based material. In this example, the sides 128, 132, and 136 are rolled or hemmed to provide the radius. The side 124, in contrast to the sides 128, 132, and 136, is formed to an approximate 90 degree angle such that the side 124 has substantially no radius. Other examples could include an aperture 116 with other combinations of sides including a radius, or no sides including a substantial radius.

In this exemplary non-limiting embodiment, the cantilever 112 is shown extending from the tray 64 into an aperture 116 provided by the bracket 120. In another example, the cantilever could extend from the vehicle frame 100 or another component other than the battery pack 14. Such a cantilever could extend into an aperture provided by the battery pack 14, such as an aperture molded within the tray 64.

Strap Interface

Figure 11:
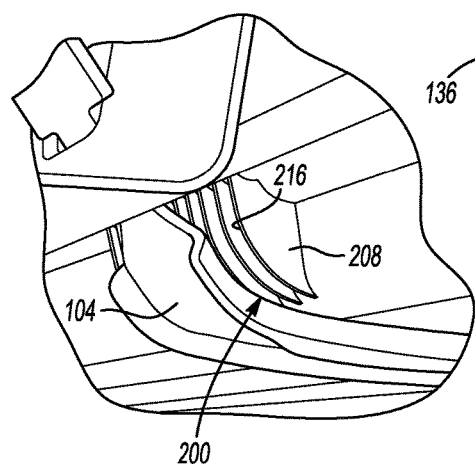
FIG. 11 illustrates a close-up view of an interface between a corner of the battery pack in FIG. 1 and a strap.
Figure 12:
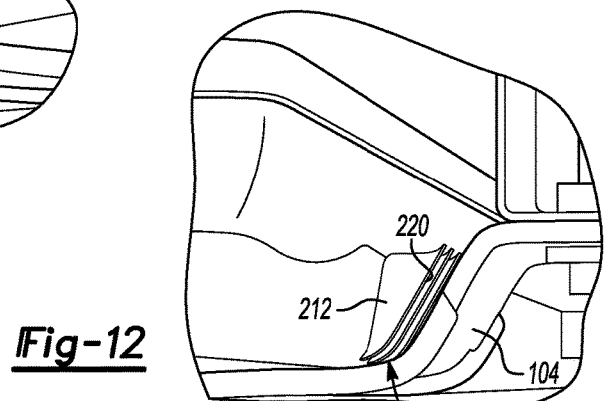
FIG. 12 illustrates a close-up perspective view of another corner of the battery pack of FIG. 1 interfacing with the strap.

Referring now to FIG. 2 with reference to FIGS. 11 and 12, the example strap 104 extends beneath the battery pack 14. Tensioning the strap 104 can result in relatively high stresses between the straps 104 and the battery pack 14, especially near the corners 200 and 204 of the tray 64 where the sidewalls 76 extend from the floor 78.

The exemplary tray 64 includes a series of ribs 208 where the strap 104 interfaces with the corner 200. The tray 64 further includes a series of ribs 212 where the strap 104 interfaces with the corner 204. The ribs 208 and 212 help to reduce the higher stresses at the corners 200 and 204 by distributing these stresses over a larger area of the tray 64. This effectively reduces stress at a given point within the tray 64, which makes the tray 64 more capable of receiving loads from the tensioning of the strap 104 without causing deformation in the corners 200 and 204, or in another area of the tray 64.

The ribs 208 and 212 can be individually sized to accommodate desired stresses. For example, if the corner 200 requires greater strength, the ribs 208 can be increased in thickness, or additional ribs 208 can be added. If less strength at the corner 200 is desired, the individual ribs 208 can be thinned or some of the ribs 208 removed.

An outermost profile 216 of the ribs 208 generally matches and mimics a curvature of the strap 104 where the strap 104 interfaces with the corner 200. Similarly, an outermost profile 220 of the ribs 212 generally mimics a curvature of the surface of the strap 104 where the strap 104 interfaces with the corner 204. That is, the outermost profiles 216 of the ribs 208, and the outermost profiles 220 of the ribs 212 can be formed to align with the profiles of the strap 104 at the corners 200 and 204 respectively.

Support and Alignment Ribs

Figure 13:
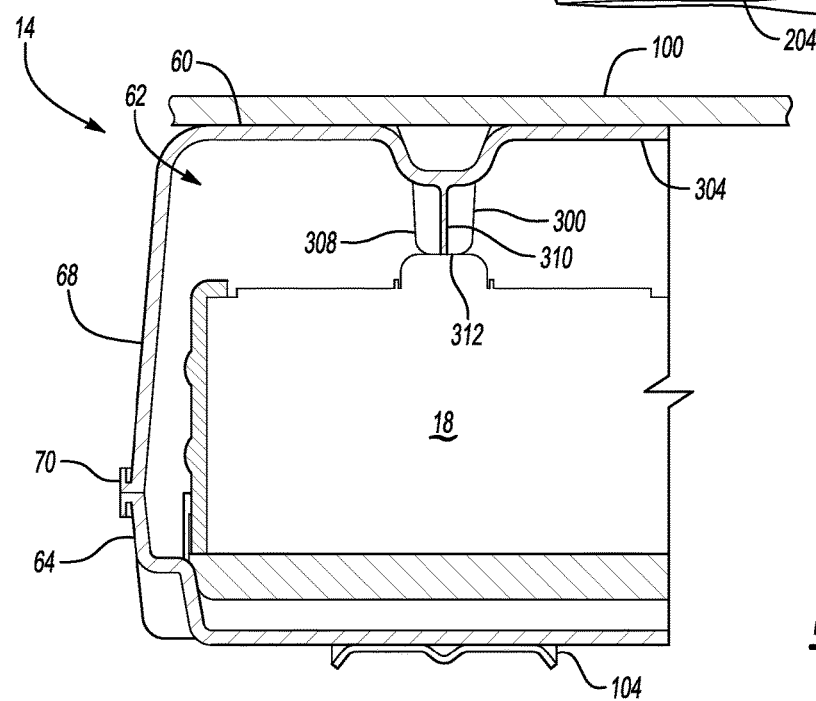
FIG. 13 illustrates a section view of the battery pack of FIG. 2 showing a rib structure extending from a cover of the enclosure.
Figure 14:
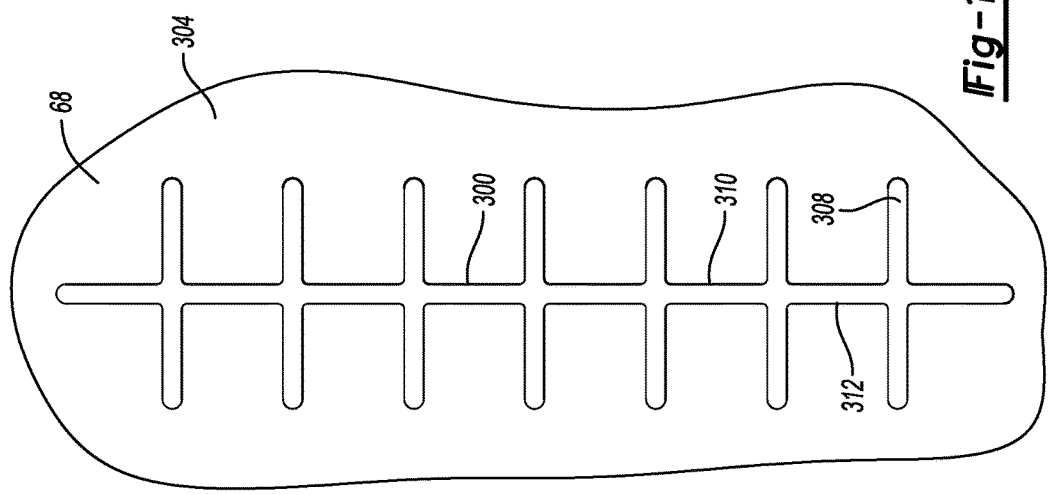
FIG. 14 illustrates a front view of the rib structures of FIG. 13.

Referring now to FIGS. 13 and 14, the cover 68 of the exemplary battery pack 14 includes a rib structure 300 within the interior 62. The rib structure 300 extends from an interior surface 304 of the cover 68 to contact a component within the enclosure 60. In this example, the component is one of the arrays 18.

The rib structure 300 include cross ribs 308 and a median rib 310 extending from the interior surface 304 to an end face 312. In this example, the median rib 310 is extending in an axial direction with reference to the axis A in FIG. 5. The median rib 310 is intersected by a plurality of the relatively shorter cross ribs 308 arranged generally perpendicularly to the median rib 310. The median rib 310 acts as a structural wall that can allow the cover 68 to transmit the loads to components, such as the array 18, along a more distributed area than ribs lacking the median rib 310. The rib structure 300 can be formed together with the cover 68 or some other part of the enclosure 60, such as the tray 64.

As the battery pack 14 is compressed against the vehicle frame 100 by the straps 104, the rib structure 300 transfer loads from the arrays 18 to the remaining portions of the cover 68.

Figure 15:
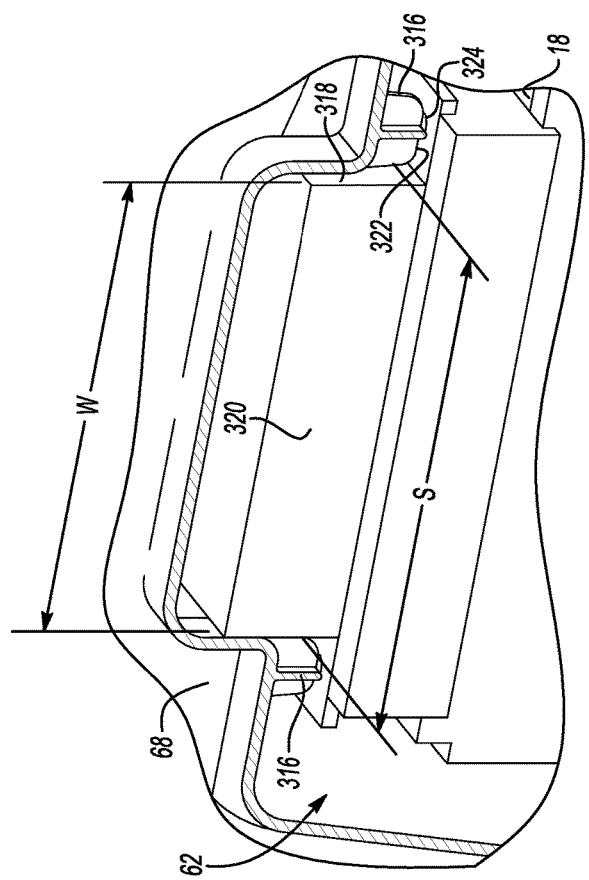
FIG. 15 illustrates a section view of rib structures extending from another area of the lid.

Referring now to FIG. 15, another portion of the cover 68 include other example rib structures 316 extending into the interior 62 from another area of the interior surface. At least a portion of the rib structures 316 extends along one of the laterally facing sides 318 of a component 320, here a battery energy control module (BECM). Each of the ribs structures 316 has a cross-hair profile in this example (see FIG. 16).

The rib structures 316 are positioned on opposing lateral sides 318 of the component 320. A space S between the rib structures 316 is slightly smaller than a width W of the component. Pressing the component 320 within the space S between the rib structures 316 slightly deforms the rib structures 316 such that the component 320 can be held between the rib structures 316 utilizing a press fit technique. During assembly, the component 320 can be held by press fit between the rib structures 316 as the cover 68 is secured to the tray 64.

Figure 16:
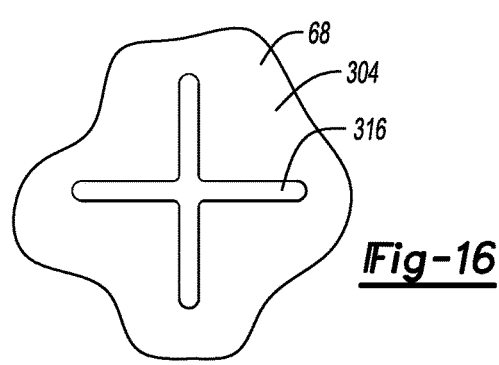
FIG. 16 illustrates a front view of one of the rib structures of FIG. 15.

Referring to FIG. 16, a rib structure 316a is another example of the rib structures 316 in FIG. 15. The rib structure 316a extends from an interior surface of the cover 68 and includes a locator pin 328 extending from its end face 322a. The locator pin 328 is formed together with the rib structure 316a and the cover 68. The locator pin 328 is received within the aperture 324 of the component 320. The locating pin 328 within the aperture 324 could help locate the component 320 when held within the space S. The rib structure 316a can be formed together with the cover 68 or some other part of the enclosure 60, such as the tray 64 (FIG. 2).

Figure 17:
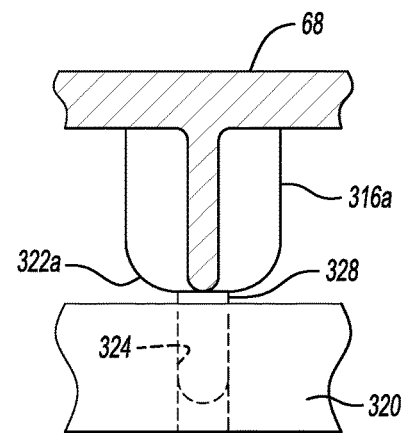
FIG. 17 illustrates a close-up view of one of the rib structures in FIG. 15 according to another exemplary embodiment.
Figure 18:
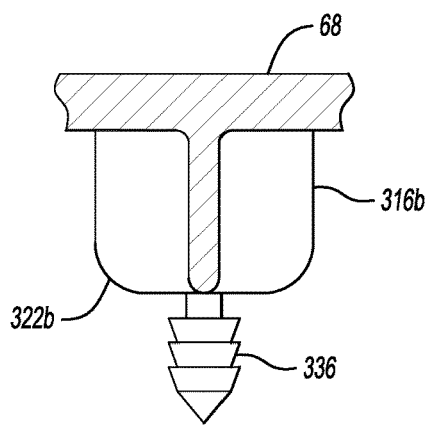
FIG. 18 illustrates a close-up view of one of the rib structures in FIG. 15 according to yet another exemplary embodiment.

Referring now to FIG. 17, a rib structure 316b is another example of the rib structures 316 in FIG. 15. The rib structure 316b extends from an interior surface of the cover 68. The rib structure 316b has a retainer feature 336 extending from an end face 322b of the rib structure 316b. The rib structure 316b can be formed together with the cover 68 or some other part of the enclosure 60, such as the tray 64.

Foamed Polymer Molding

Figure 19:
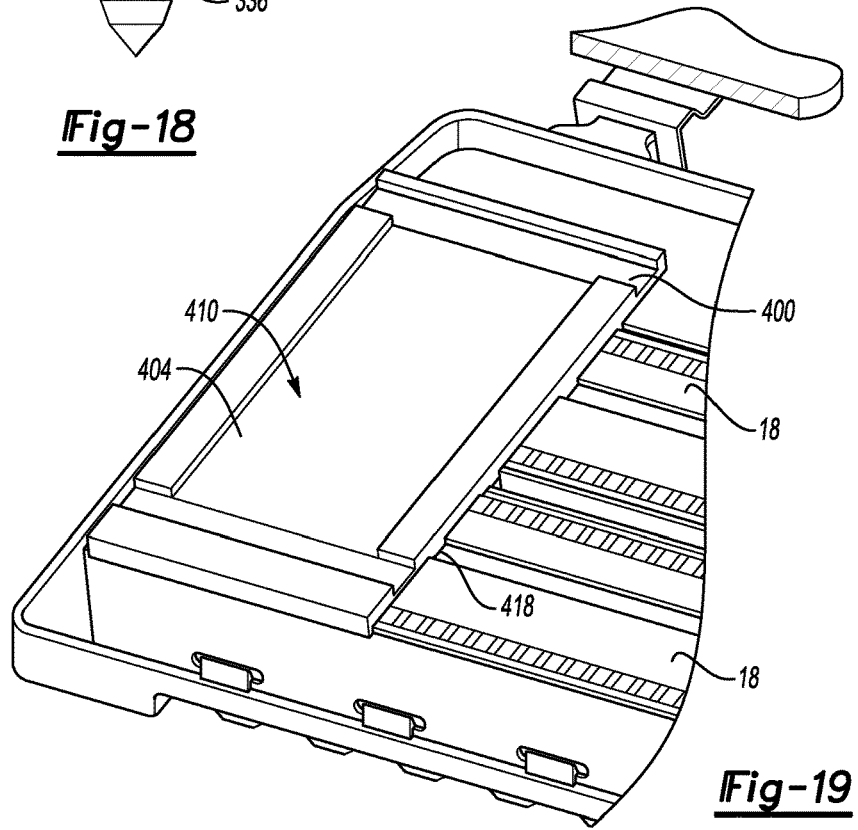
FIG. 19 illustrates a perspective view of a foamed polymer molding within a portion of the battery pack of FIG. 2.
Figure 20:
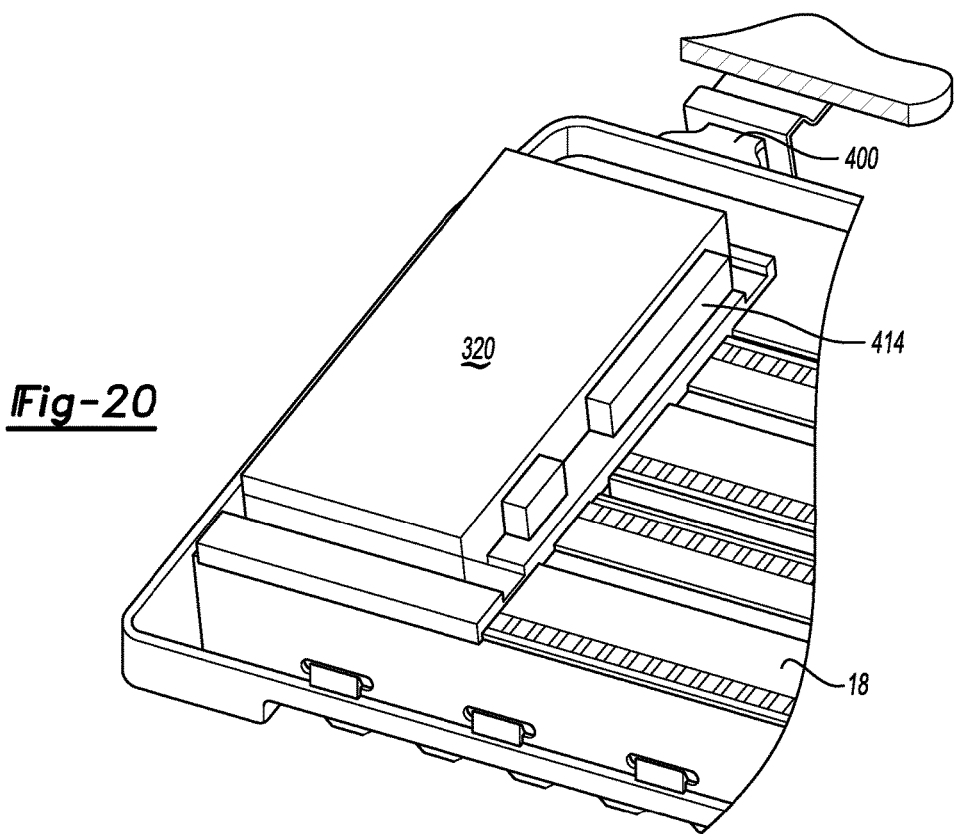
FIG. 20 illustrates the foamed polymer molding of FIG. 19 sandwiched between adjacent components of the battery pack of FIG. 2.

Referring now to FIGS. 19 and 20, with reference to FIG. 2, the example battery pack 14 can include other features to facilitate alignment of components within the battery pack 14 and to accommodate loads.

One such feature is a foamed polymer molding, such as a foam block 400. The example foam block 400 is an example type of a foamed polymer molding. Exemplary materials for the foam block 400 could include an expanded polypropylene, an expanded polyethylene, an expanded polystyrene, or other such polymer.

A surface 404 of the foam block 400 can be molded with features, such as recesses 410, that mimic contours within a corresponding surface of the component 320. The component 320 can be positioned within the recesses 410 to help properly position the component 320 within the battery pack 14.

Additional foamed polymer moldings 414 can be secured to the component 320, the foam block 400, or both to further cushion and restrict movement of the component 320.

A surface 418 of the foam block 400 opposing the surface 404 can interfacing with the arrays 18. The surface 418 can be formed to mimic geometry of the corresponding surfaces of the arrays 18. Forming the surface 418 to mimic these geometries can facilitate positioning the foam block 400 tightly against the arrays 18 and facilitate aligning the foam block 400 relative to the arrays 18.

The foam block 400 of the foamed polymer can be sized to clear locating features passing through mounting brackets associated with the component 320, such as the rib structures 316 of FIG. 15. The foam block 400 can have molded in formations designed to receive retaining clips extending from the enclosure 60, such as the retainer feature 336 in FIG. 17. If the retainer feature 336 engages an aperture within the foam block 400, the foam block 400 can hold the component 320 between the cover 68 and the foam block 400.

The foam block 400 provides a layer within the battery pack 14 that can facilitate electrically and thermally isolating various components close to the arrays 18 from thermal energy and electricity of the arrays 18. The foam block 400 provides a relatively compliant layer within the battery pack 14 that can assist in spring fit retention of components within the enclosure 60 as the straps 104 compress the battery pack 14 against the vehicle frame 100 (FIG. 2).

Rib Groupings

Figure 21:
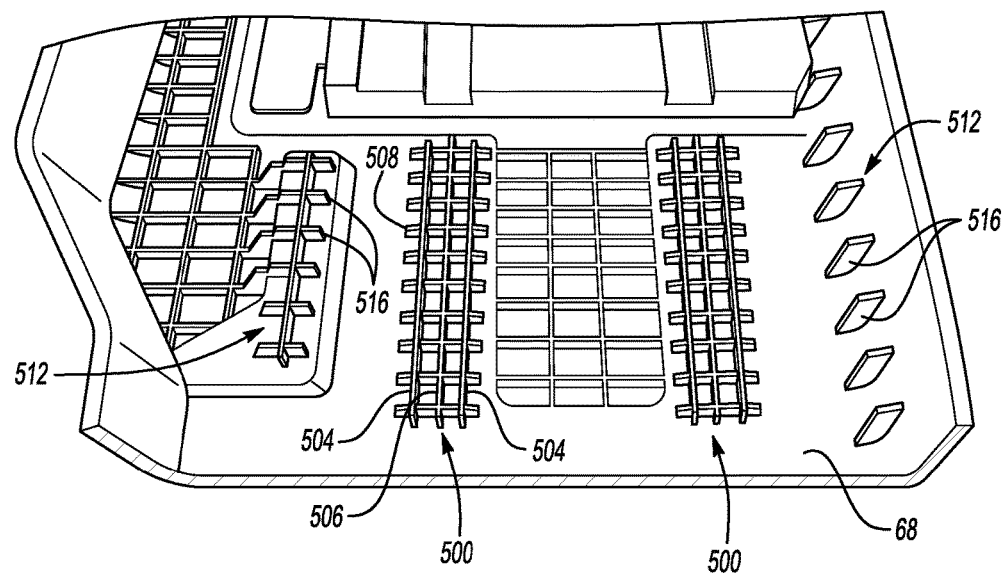
FIG. 21 illustrates a view of an interior of the cover of the enclosure in FIG. 2.

Referring now to FIG. 21 with continuing reference to FIG. 2, additional exemplary features of the cover 68 include rib groupings 500. When assembled within the battery pack 14, one of the rib groupings 500 aligns with each of the arrays 18 and help to locate the cover 68 with respect to the arrays 18.

The rib groupings 500 generally align with a median of the arrays 18. The rib groupings 500 can transfer loads between the cover 68 and the arrays 18 resulting from, among other things, the straps 104 compressing the battery pack 14 against the vehicle frame 100.

The rib groupings 500 each include two primary axially extending ribs 504, a secondary axially extending rib 506, and a plurality of cross ribs 508. The secondary axially extending rib 506 is positioned between the two primary axially extending ribs 504. The primary axially extending ribs 504 extend further from an interior surface of the cover 68 than the secondary axially extending ribs 506. The primary axially extending ribs 504 can nestle around an upper central structure of the arrays 18 to restrict transverse movements of the arrays 18 relative to the cover 68. The primary axially extending ribs 504 restrict this side to side movement of the arrays 18 relative to the cover 68 if the movements are vibratory or related to an impact event.

The plurality of cross ribs 508 are arranged transversely to the two primary axially extending ribs 504 and the secondary axially extending rib 506. The plurality of cross-ribs 508 extend from the cover 68 about the same distance as the primary axially extending ribs 504 in this example. The cross ribs 508 can provide support to prevent the primary axially extending ribs 504 from flexing during installation. Although the cross ribs 508 are substantially perpendicular to the axially extending ribs 504, 506, other designs could incorporating cross ribs 508 disposed at some angle between 90 and 0 degrees relate to the axially extending ribs 504, 506. Additionally, although the primary axially extending ribs 504 and the secondary axially extending rib 506 are parallel in this example, other orientations could be used, including orientations where the secondary axially extending rib 506 is disposed transversely to the primary axially extending ribs 508.

The exemplary cover 68 further includes two sets of outer array ribs 512 having laterally facing surfaces 516 that contact the sides of the arrays 18 to further constrain side to side movement of the arrays 18 relative to the cover 68.

Some features of the examples of this disclosure can include retention features made of a thermoplastic that are capable of holding higher loads than known designs. Further, some of the retention and location features are incorporated directly into existing components of the enclosure 60 (i.e., the tray 64 and the cover 68), which can reduce a quantity of components and operations required to retain components within the enclosure 60. The retention and location features can be thermally insulating and electrically isolating.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery retention assembly, comprising:
  a first attachment feature formed with a portion of an enclosure that houses a battery array disposed along an axis, the first attachment feature disposed within an interior of the enclosure and sized such that a portion of the first attachment feature is received within a second attachment feature of the battery array to hold the battery array within the interior of the enclosure, an axial length of the first attachment feature less than an axial length of the second attachment feature.

2. The traction battery retention assembly of claim 1, wherein the first attachment feature extends through an aperture in a thermal exchange plate when engaging the second attachment feature.

3. The traction battery retention assembly of claim 2, wherein the portion of the enclosure is an enclosure floor.

4. The traction battery retention assembly of claim 1, wherein the first attachment feature is integrally formed with the portion of the enclosure such that the first attachment feature and the portion of the enclosure are a monolithic structure.

5. The traction battery retention assembly of claim 1, wherein the first attachment feature is a hook and the second attachment feature provides a surface to interface with an overhang surface of the hook.

6. The traction battery retention assembly of claim 1, wherein the second attachment feature is an aperture in the battery array.

7. The traction battery retention assembly of claim 1, wherein the enclosure is formed of a polymer-based material.

8. A traction battery retention assembly, comprising:
a first attachment feature formed with a portion of an enclosure that houses a battery array disposed along an axis, the first attachment feature sized such that a portion of the first attachment feature is received within a second attachment feature of the battery array to hold the battery array within the enclosure; and
a cantilever extending from a first structure, the cantilever received within an aperture of a second structure and biased against the second structure to restrict movement of the enclosure relative to a vehicle frame.

9. The traction battery retention assembly of claim 8, wherein the first structure is a portion of the enclosure and the cantilever is formed together with the portion of a battery pack enclosure.

10. The traction battery retention assembly of claim 8, wherein the second structure is a vehicle frame, and the vehicle frame includes edges providing the aperture, wherein the vehicle frame is a metal or metal alloy and the edges are radiused.

11. The traction battery retention assembly of claim 8, wherein the second structure includes a primary side of the aperture, the cantilever biased against the primary side in a first direction, wherein the second structure includes at least one other side of the aperture, the at least one other side of the aperture contacting the cantilever to restrict movement of the cantilever in at least one second direction that is transverse to the first direction.

12. The traction battery retention assembly of claim 8, further comprises a strap secured to the vehicle frame and supporting the battery pack, the strap interfacing with a plurality of ribs along a corner of an enclosure of the battery pack.

13. A traction battery retention assembly, comprising:
a flange of an outer wall of a battery array, the flange folded outward from adjacent areas of the outer wall, a material thickness maintained through the flange and the adjacent areas of the outer wall; and
an attachment feature formed with a portion of an enclosure that houses the battery array, the attachment feature extending from an enclosure surface and including an overhang surface facing the enclosure surface, the overhang surface contacting a surface of the flange to hold the array relative to the enclosure.

14. A traction battery pack assembly, comprising:
an enclosure of a battery pack, the enclosure formed together with at least one rib having sides extending to an end face that contacts a structure housed within the enclosure such that loads transfer from the structure to the enclosure, wherein the at least one rib is received within an aperture of the structure to restrict movement of the enclosure relative to the structure.

15. The traction battery pack assembly of claim 14, further comprising a foamed polymer molding disposed within an interior of the enclosure, the at least one rib extending to the structure through an aperture in the foamed polymer molding.

16. The traction battery pack assembly of claim 14, further comprising foamed polymer molding disposed within an interior of the enclosure, the enclosure including retention features that engage corresponding retention features to hold a component of the battery pack between the foamed polymer molding and the enclosure.

* * * * *

UNITED STATES PATENT AND TRADEMARK OFFICE
CERTIFICATE OF CORRECTION

PATENT NO. : 10,230,083 B2
APPLICATION NO. : 15/340935
DATED : March 12, 2019
INVENTOR(S) : Patrick Daniel Maguire et al.

It is certified that error appears in the above-identified patent and that said Letters Patent is hereby corrected as shown below:

In the Claims

In Claim 9, Column 13, Lines 38-39; replace "a battery pack enclosure" with --the enclosure--

In Claim 12, Column 14, Line 11; replace "the battery pack" with --a battery pack--

In Claim 12, Column 14, Lines 12-13; replace "an enclosure of the battery pack" with --the enclosure of the battery pack--

Signed and Sealed this
Sixteenth Day of April, 2019

Andrei Iancu
*Director of the United States Patent and Trademark Office*